United States Patent
Goksel

[15] 3,669,318
[45] June 13, 1972

[54] FEEDER FOR HIGH PRESSURE AUTOCLAVE

[72] Inventor: Mehmet Adnan Goksel, Houghton, Mich.

[73] Assignee: Michigan Technological University, Houghton, Mich.

[22] Filed: Oct. 15, 1970

[21] Appl. No.: 81,018

[52] U.S. Cl............................................222/307, 222/366
[51] Int. Cl........................................................G01f 11/18
[58] Field of Search..................222/361, 366, 354, 355, 305, 222/306, 307

[56] References Cited

UNITED STATES PATENTS

| | | | |
|---|---|---|---|
| 1,233,791 | 7/1917 | Kaiser | 222/361 X |
| 1,273,720 | 7/1918 | Bachand | 222/307 |
| 2,780,984 | 2/1957 | Kleeman | 222/355 X |
| 3,029,002 | 4/1962 | Gregoire | 222/307 |
| 3,285,669 | 11/1966 | Clark | 222/361 X |

Primary Examiner—Robert B. Reeves
Assistant Examiner—John P. Shannon, Jr.
Attorney—John W. Michael, Gerrit D. Foster, Bayard H. Michael, Paul R. Puerner, Joseph A. Gemignani and Andrew O. Riteris

[57] ABSTRACT

A material handler for a high pressure autoclave includes a combination of a body and a dished in cross section material carrier relatively arranged in a telescoping manner. The material carrier can be withdrawn from the body to a carrying position or telescoped into the body to eliminate the volume of the carrier. The body and carrier move in a passage to alternately position the carrier at a material transfer opening or in the autoclave. The carrier is telescoped into the body after material is removed therefrom, and while still in the autoclave, to eliminate its volume and avoid transferring atmosphere from one position to the other. The body and carrier combination has a sealed engagement in the passage.

12 Claims, 7 Drawing Figures

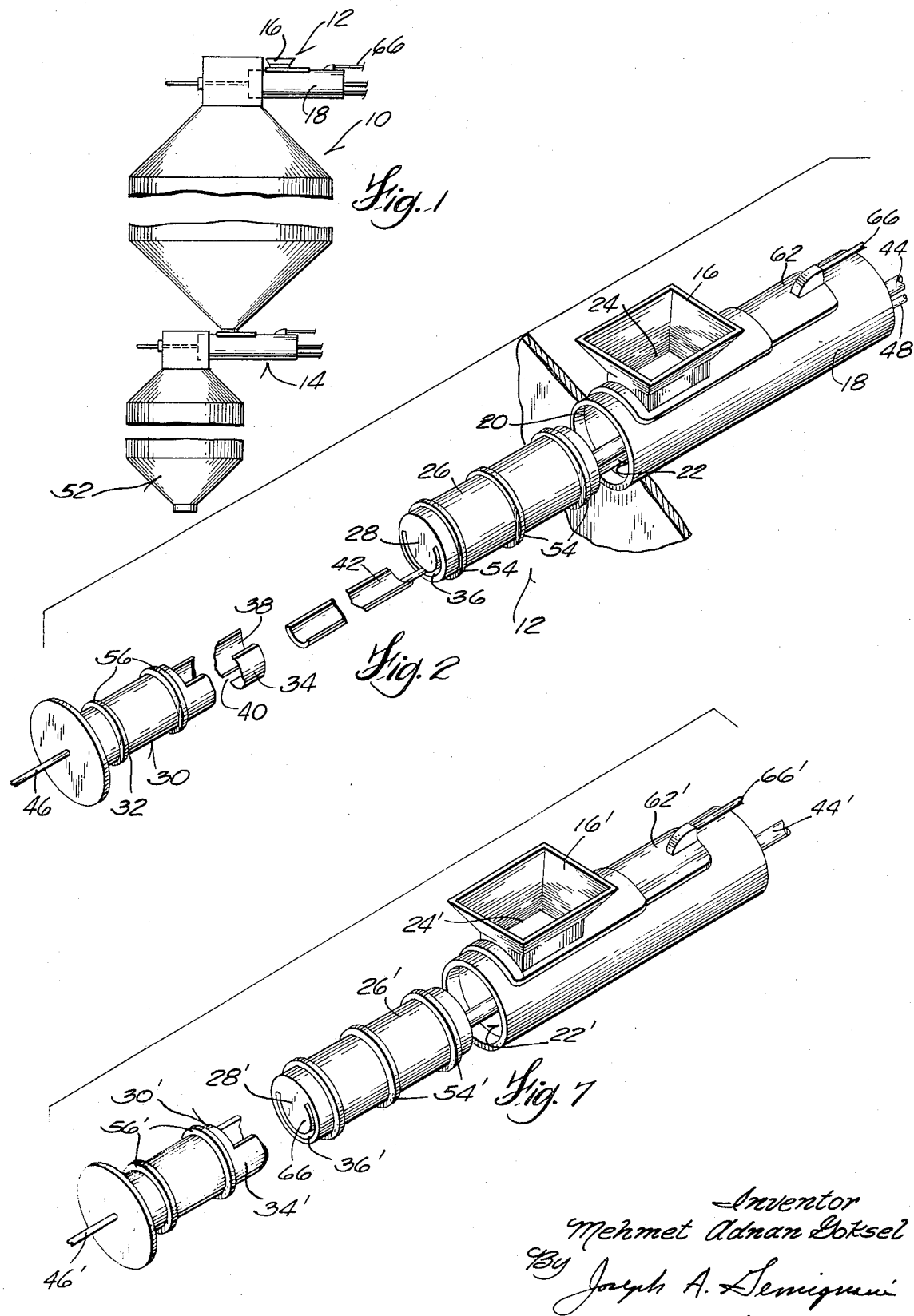

PATENTED JUN 13 1972 3,669,318

Inventor
Mehmet Adnan Goksel
By Joseph A. Geminani
Attorney

FEEDER FOR HIGH PRESSURE AUTOCLAVE

This invention relates to material handlers such as those used in the feeding of material to, or the unloading of material from, high pressure autoclaves and the like.

One of the problems encountered in feeding or removing material from installations having a controlled atmosphere, such as an autoclave, is to accomplish the material transfer while maintaining the controlled atmosphere. This problem has been recognized in the past and various material handling arrangements have been proposed as solutions. Such solutions have generally not been entirely satisfactory for one reason or the other, for example they have not adequately sealed, or do not lend themselves to adequate sealing, they do not achieve satisfactory isolation of the controlled atmosphere, they have handled the material being processed in a manner detrimental to the material handler itself, or have generally been too complex in construction and/or operation.

Among the general objects of this invention are to provide an improved and effective material handler which optimizes isolation of a controlled atmosphere while transferring material with respect to that atmosphere and/or to handle that material in a manner which is not detrimental to either the installation itself or the isolation of the controlled atmosphere.

For the achievement of these and other objects, this invention proposes an arrangement wherein a body and material carrier are supported for movement in a passage communicating with a chamber having a controlled atmosphere therein. The body and carrier can be moved jointly in the passage and, in addition, are movable relative to each other to provide for receipt and discharge of material into and out of the carrier and also to provide for transportation of the material in the passage relative to the chamber. The body and/or the carrier have a sealed engagement in the passage and the carrier can be telescoped into the body as desired to thereby maintain the controlled atmosphere.

Although the present invention has been illustrated and described in connection with various embodiments thereof, it will be apparent to those skilled in the art that various changes and modifications may be made therein without departing from the spirit of the invention or from the scope of the appended claims.

DESCRIPTION OF THE DRAWINGS

FIG. 1 is a general illustration of the material transfer arrangement of this invention in a particular application;

FIG. 2 is an exploded perspective view of the material transfer arrangement;

FIG. 7 is an exploded perspective view of an alternative arrangement.

Figure 3:
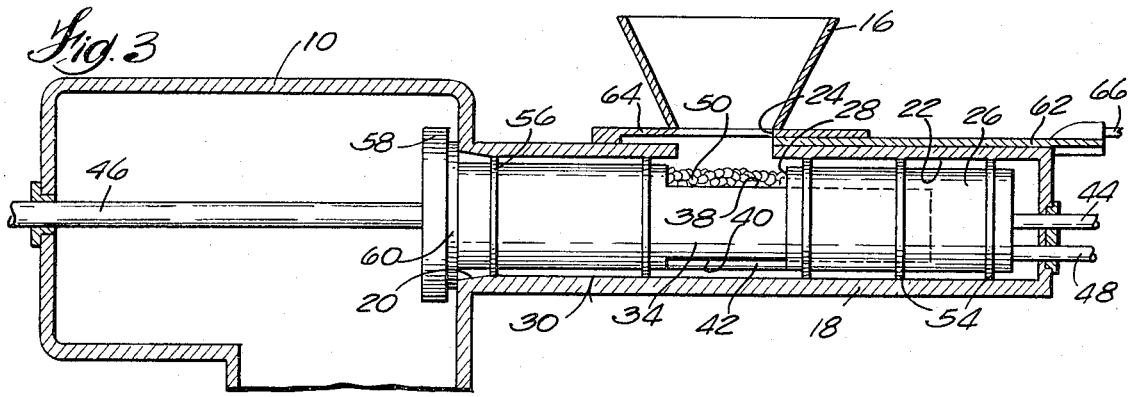
FIGS. 3, 4, 5, and 6 are a series of axial sections illustrating an operating cycle for the material transport arrangement.

This invention will find particular use in the feeding, or unloading, of a high pressure autoclave and for that reason will be described in that environment. However, it is appreciated that this invention may have wider application in the transfer of material with respect to any chamber or vessel where isolation is desired or it is intended that a particular environment, or lack of one, be controlled or maintained, for example, vacuum chambers, radiation cells, and the like.

With particular reference to FIG. 1, a high pressure autoclave 10 has an internal steam filled chamber which is maintained at a prescribed internal pressure and temperature. The autoclave may be used in treating various process materials and material feeder assemblies 12 and 14 will deliver such materials and in any desired shape such as pellets or briquettes. In this instance, pellets are delivered to and removed from the autoclave by the feeder assemblies. Feeders 12 and 14 are of identical construction and hence only the former will be described, it being appreciated that this description of the feeder and its operation is applicable as well to feeder 14. In order to better correlate the operation of feeders 12 and 14 general comment will be made with respect to feeder 14 where necessary.

Feeder 12 is adapted to receive pellets through a hopper 16 and deliver those pellets to the internal chamber of the autoclave while at all times maintaining a seal between hopper 16 and the interior chamber. Moreover, operation is such that the area in which the pellets are carried into the autoclave is eliminated before removal from the autoclave. This arrangement is provided in order to maintain the integrity of the controlled atmosphere within the autoclave.

Structurally, feeder 12 includes a tubular member 18 which communicates with the internal chamber of the autoclave through opening 20. Member 18 is hollow and the interior thereof defines an elongated passage which has one end communicating with the interior of the autoclave. Hopper 16, through an opening 24, communicates with the interior passage 22 defined by member 18 and at a point spaced from the opening through which that passage communicates with the autoclave. A cylindrical body 26 is positioned in passage 22 and has an axial end 28 thereof which faces toward the internal chamber of the autoclave. A material carrier 30 is associated with body 26 and includes a generally solid portion 32 and an elongated, generally dished in transverse cross section portion 34 extending from that solid portion.

End 28 of body 26 includes an opening 36 which has a configuration corresponding generally to that of portion 34 of carrier 30. In this instance carrier 30 specifically has the shape of a segment of a cylinder with an upwardly directed open end 38 and, correspondingly, opening 36 is generally U-shaped. Dished portion 34 of the carrier is positioned so as to be capable of telescoping into body 26 through opening 36 so that the open area of dished shaped portion 34 can be selectively collapsed by movement of portion 34 into body 26.

In the construction depicted in FIG. 2–6, an opening 40 is also provided in the lower end of carrier portion 34, i.e., opposite to the open end 38 thereof. A movable closure 42 is supported at opening 40 for movement relative to that opening to selectively open and close it.

An elongated rod 44 is connected to body 26 and similarily rod 46 is connected to carrier 30. Both rods are connected to suitable operating mechanisms, for example, hydraulic cylinders (not shown), which are operable one independently of the other so that body 26 and carrier 30 may be moved jointly in passage 22 relative to the autoclave and hopper 16, or the body and carrier can be moved relative to each other. Similarly, a rod 48 is connected to closure 42 and to a third operating mechanism (again a hydraulic cylinder not shown) which permits closure 42 to be moved jointly with body 26 and carrier 30 or independently relative to opening 40.

Figure 4:
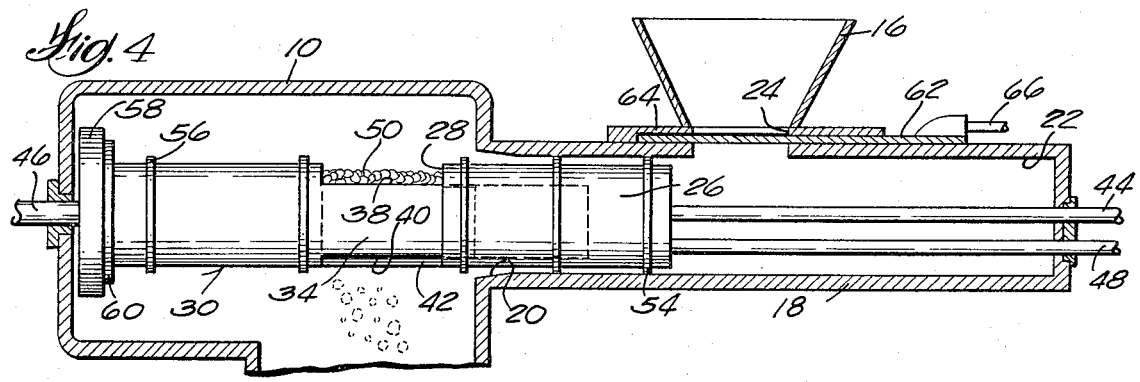
Figure 5:
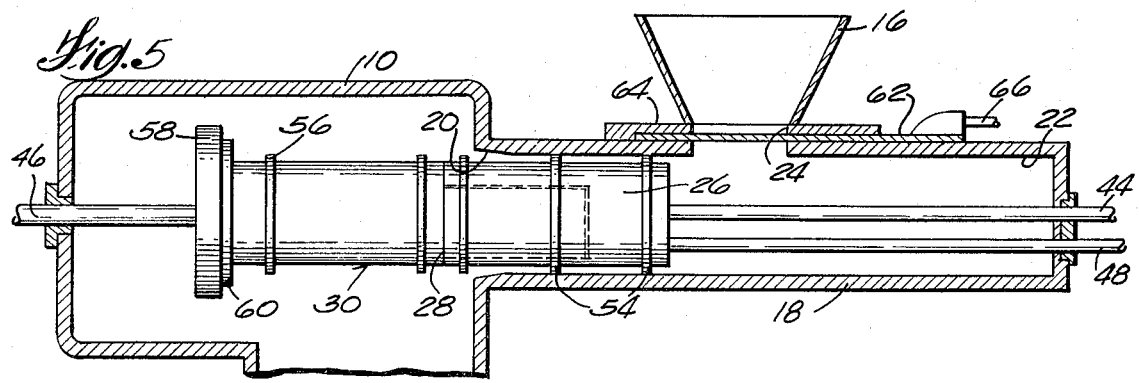
Figure 6:
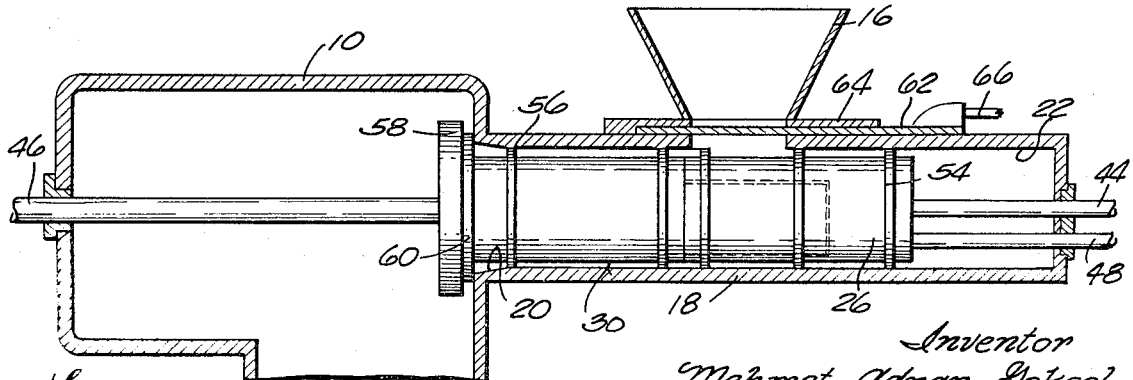

With this general structural description in mind, the operation of the feeder arrangement will be described through an operational cycle. Starting with FIG. 3, body 26 is illustrated as positioned at the extreme right hand end of passage 22 and with the dished shaped portion 34 of carrier 30 engaged in opening 36 of body end 28 but withdrawn partially therefrom. The dished shaped carrier is positioned with its open end 38 below hopper 16 to receive pellets 50 therefrom. When pellets 50 have been loaded into carrier 34, rods 44, 46, and 48 are operated simultaneously to move body 26 and carrier 30 to the left, and also to maintain closure 42 covering opening 40 and prevent premature discharge of pellets 50. With this actuation of rods 44, 46, and 48, the feeder arrangement is positioned as illustrated in FIG. 4. In this position, the dished shaped carrier 34 is located within the autoclave chamber. When so positioned, rod 48 is operated independently of rod 44 and 46 to withdraw closure member 42 to the right and into body 26. This opens opening 40 and permits pellets 50 to drop (dotted line showing) from the dished carrier into the autoclave. After the pellets have been fully discharged from the carrier, rod 46 is operated to telescope or collapse dished shaped portion 34 into body 26, i.e., the position of FIG. 5. As will be noted from the comparison of FIGS. 4 and 5, the otherwise open carrier area of dished portion 34 which was disposed within the autoclave is thus completely collapsed eliminating its area and preventing entrapment of steam. Thus the integrity of the interior of the autoclave is maintained and the atmosphere therein is not carried out to the hopper 16 by the feeder. After the carrier chamber has been collapsed into body 26, rods 44, 46, and 48, are moved to the right to position the feeder as illustrated in FIG. 6. At this point, rod 44 alone can be operated to return the feeder to the arrangement illustrated in FIG. 3 and opening the dished shaped carrier 34 to hopper 16 to receive a subsequent supply of pellets.

At this point it should be noted that with respect to feeder 14, the same cycle of operation is carried through except that in this instance the process pellets are received through the hopper into the dished shaped carrier and are transferred to a cooler 52.

Body portion 26 is provided with gasket rings 54 which engage the walls of passage 22. Similarly, portion 32 of carrier 30 is provided with gasket rings 56 which also engage the walls of passage 22. In the loading position of the feeder, i.e., FIG. 3, and in the unloading position of the feeder, i.e., FIG. 4, rings 56 or 54 engage the passage between hopper 16 and the autoclave, respectively. This effects a seal between the hopper and the interior of the autoclave to prevent steam leakage during operation.

Also, carrier 30 is provided with a flanged end 58 which carries a gasket 60. When the feeder arrangement is positioned so as to receive pellets through hopper 16 gasket 60 is engaged around opening 20 to further seal the interior of the autoclave.

If the material to be transferred into the autoclave is fed through the hopper 16 in a continuous manner, a door 62 can be provided to selectively close opening 24. It should be appreciated that if measured amounts of the pellets, or other process material, are delivered through hopper 16, the door may be eliminated. Where the door is provided, it is generally arcuate in transverse cross section so as to conform to the outside of member 18. The door is arranged for sliding movement in a cover plate 64 attached to the outer wall of member 18 and can be moved into and out of registery over opening 24. Door 62 is connected by a rod 66 to a suitable operating mechanism, i.e., a hydraulic cylinder, for selective operation of the door.

FIG. 7 discloses an alternative arrangement of the feeder arrangement. In the arrangement which has already been described, the dished shaped carrier was open at its top and bottom and an auxiliary closure, door 42, was provided to selectively open and close the bottom of the carrier for carrying or discharging the process material. In the embodiment of FIG. 7, carrier 34' does not have a lower opening but is a continuous member in the form of a segment of a cylinder. In this embodiment, carrier portion 34' fits into a corresponding U-shaped opening 36' in the axial end 28' of body 26'. Carrier 30' and body 26' are supported for rotation as well as axial movement in passage 22'. With this arrangement, when the carrier 34' is positioned in the autoclave, it and body 26' can be rotated 180° to discharge pellets carried in portion 34' into the autoclave. After discharge, reverse rotation positions the carrier for receipt of a subsequent charging of material through hopper 16'. Except for the variation of discharging the material through rotation of carrier 34' the structure and operational cycle of the arrangement of FIG. 7 is the same as that already described in connection with FIGS. 2–6. It should also be appreciated that in addition to rotating the entire body 26', means can be provided for merely rotating the internal member 66 thereof which together with body 26' defines the U-shaped opening in which the carrier moves.

With the feeder arrangement described above, effective charging and discharging, of an autoclave is effected. The arrangement is relatively simple and compact with a minimum of relatively movable parts to maintain both simplicity of operation and construction. Also, the process material is carried in such a manner that it does not directly engage the interior walls of passage 42. Hence, the feeder arrangement can be used with abrasive material if desired without the danger of the process material adversely affecting the interior walls, or gasket rings which cooperate in perfecting the seal.

Although this invention has been illustrated and described in connection with particular embodiments thereof, it will be apparent to those skilled in the art that various changes and modifications may be made therein without departing from the spirit of the invention or from the scope of the appended claims.

I claim:
1. In combination
a process chamber,
means defining a passage having a first opening communicating with said chamber,
a material transport assembly supported for movement in said passage and through said first opening,
means defining a second opening in said passage spaced from said first opening,
said transport assembly comprising
a body disposed in said passage and having an end,
means defining a generally elongated, generally dished in transverse cross section material carrier,
means defining an opening in said body end for receiving said carrier therein so that said carrier is movable in said body end opening relative to said body,
and means connected to said body and carrier for moving said body and carrier jointly in said passage, for moving said carrier relative to said body in said body opening, and further for alternately positioning said carrier in alignment with said second opening and in said chamber so that said carrier is movable between said first opening and chamber and can be telescoped into said body through said body end opening to eliminate the carrier area,
and sealing means engaged between said body and passage to seal said chamber from said second opening.

2. The combination of claim 1 wherein said opening in said body end corresponds generally in configuration to the dished configuration of said carrier.

3. The combination of claim 2 wherein said passage is generally tubular and extends generally laterally from said chamber.

4. The combination of claim 3 including means for discharging material from said carrier when said carrier is positioned in said chamber.

5. The combination of claim 4
wherein said dished carrier has an open, upwardly directed side which is positionable below said second opening for receipt of material from said second opening into said carrier,
and wherein said means for discharging material from said carrier includes means defining an opening in a lower side of said carrier and means defining a movable closure at said opening in said lower side for relatively opening and closing said lower side of said carrier.

6. The combination of claim 4
wherein said dished carrier has an open, upwardly directed side positionable below said second opening for receipt of material from said second opening into said carrier,
and including means for rotating said carrier to position said open side downwardly for discharge of material from said carrier.

7. The combination of claim 4 including
a material delivery hopper at said second opening,
a closure member at said second opening,
and means for moving said closure relative to said second opening to selectively open and close said hopper to said passage.

8. The combination of claim 4 including, operator means for said body and said carrier and operable to move said carrier and body jointly relative to said passage and independently of each other relative to said passage and each other.

9. The combination of claim 4 including seals on said body and carrier arranged so that the seals on one of said body and carrier engage the inner walls of said passage when said carrier is positioned at said second opening and in said chamber to thereby seal said chamber from said second opening.

10. The combination with an autoclave having a controlled atmosphere chamber therein of a material transport assembly comprising, in combination, means defining an elongated, generally tubular passage communicating with said chamber through a first opening, means defining a second opening in said passage spaced from said first opening, a body disposed in said passage and having an end, said body supported for movement in said passage between said first and second openings, a generally elongated, dished in transverse cross section carrier, means supporting said carrier for movement into and out of said body through said end and also for joint movement of said carrier and body in said passage so that said carrier and body are movable between said chamber and said second opening and said carrier is selectively movable into said body to eliminate the area thereof, and means for sealing said chamber from said second opening.

11. The combination of claim 10 wherein said opening in said body end corresponds generally in configuration to the dished configuration of said carrier.

12. The combination of claim 10 including seals on said body and carrier arranged so that the seals on one of said body and carrier engage the inner walls of said passage when said carrier is positioned at said second opening and in said chamber to thereby seal said chamber from said second opening.

* * * * *